Dec. 14, 1965   W. B. SEIDEL   3,222,824
MACHINE TOOL POSITIONING MECHANISM
Filed Oct. 30, 1963   4 Sheets-Sheet 1

INVENTOR.
WILLIAM B. SEIDEL
BY
Howard Keiser
& John F. Verhoeven
ATTORNEYS

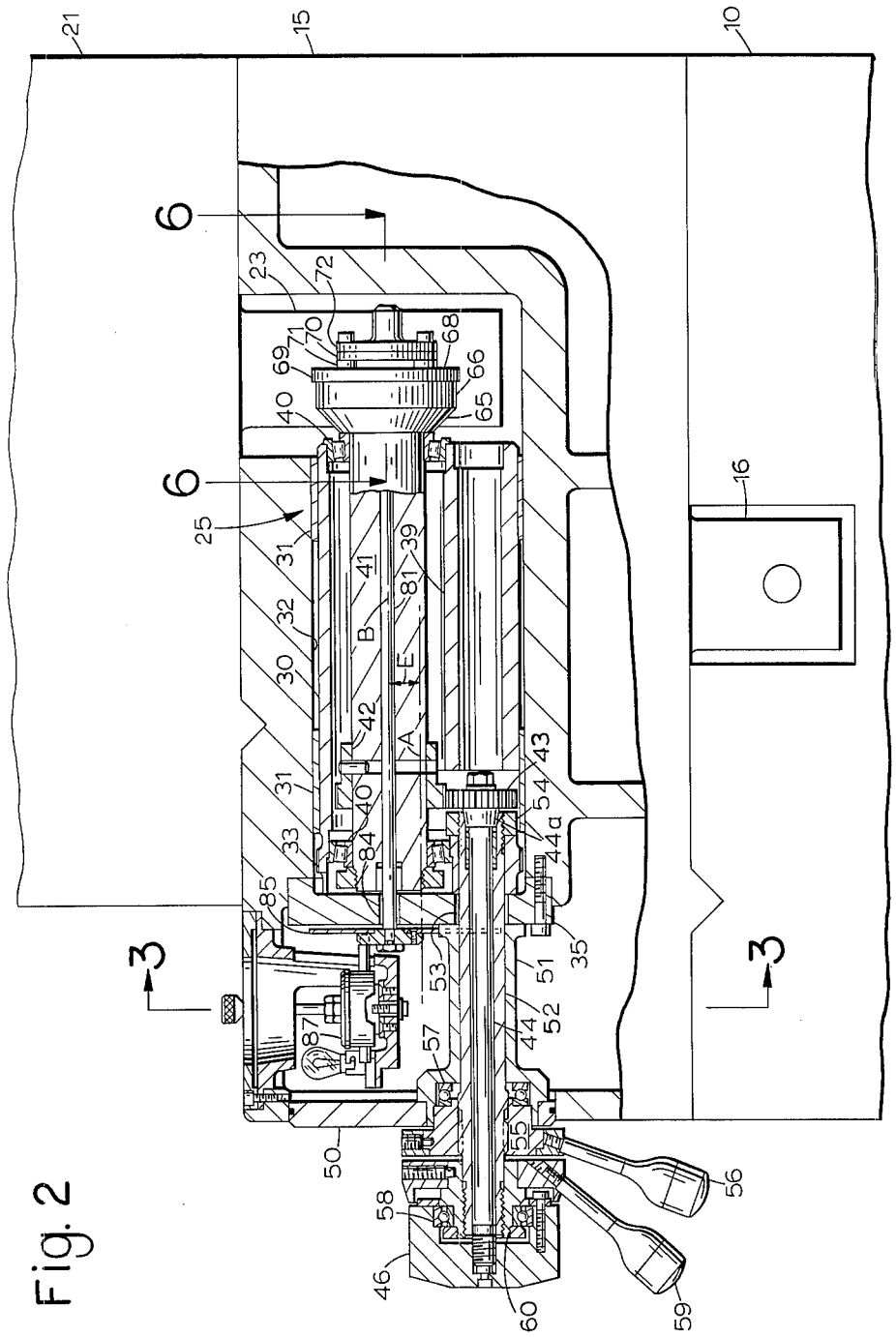

Dec. 14, 1965    W. B. SEIDEL    3,222,824
MACHINE TOOL POSITIONING MECHANISM
Filed Oct. 30, 1963    4 Sheets-Sheet 3

Dec. 14, 1965  W. B. SEIDEL  3,222,824
MACHINE TOOL POSITIONING MECHANISM
Filed Oct. 30, 1963  4 Sheets-Sheet 4

United States Patent Office 3,222,824
Patented Dec. 14, 1965

3,222,824
MACHINE TOOL POSITIONING MECHANISM
William B. Seidel, Cincinnati, Ohio, assignor to The Cincinnati Milling Machine Co., Cincinnati, Ohio, a corporation of Ohio
Filed Oct. 30, 1963, Ser. No. 320,194
7 Claims. (Cl. 51—165)

The present invention relates to positioning mechanism particularly suitable for accurate, remote positioning of a machine tool element, such as, for example, the wheelhead of a grinding machine.

In machine tool operations, the precision location of machine elements is important in producing precision machining operations. For example, the relative position of the tool to the work must be capable of precise adjustment if close tolerances are to be met. In grinding operations, where either the workpiece is moved into the grinding wheel or the grinding wheel is moved into the workpiece, the feed movement must be stopped at a precise position to grind the workpiece to a final precise desired size. If, for example, the grinding wheel is mounted on a carriage which has a fixed feed stroke, the grinding wheel must be precisely positioned on the carriage to assure that the workpiece reaches the precise desired finished size as the carriage completes its feed stroke. The positioning member of the present invention may act to move the element being positioned, or may act primarily as a stop for the machine tool element. For example, the positioning element can be used to effect a small, accurately measured, feed movement or can be used to stop the wheelhead, or wheelhead carriage, in a desired final position.

One of the difficulties of positioning a machine tool element stems from the limitations of mechanical motion transmitting mechanism. For example, if a predetermined angular rotation is given to a handwheel connected by conventional motion transmitting mechanism to a machine element, or some other predetermined input motion is applied to the input end of the motion transmitting mechanism, it will not be certain that the desired output (that is, motion of the machine tool element) will be effected because of backlash in the gears and, to a lesser extent, windup of the shafts in the motion transmitting mechanism. Thus, calibrated handwheels, or other devices which measure only the input to the motion transmitting mechanism, will err in indicating the position of the element to be positioned, or stopped, to the extent that there is gear backlash or angular deflection of the shafts in the motion transmitting mechanism.

In the present invention there is provided positioning mechanism capable of accurately moving or stopping a machine tool element even if controlled from a remote position. In the present invention the output, not the input, of the motion transmitting mechanism is measured. In other words, the position or movement of the machine element is measured, not the position or rotation of a handwheel or other actuating mechanism remote from the machine tool element. In the preferred form of the invention, a locating member, or head, is rotatable about an axis and has a peripheral surface eccentric to that axis. A circular reference plate is mounted adjacent the locating head and has a central conical seat. The reference plate is biased to a position centric relative to the axis of rotation of the locating head with the conical seat on that axis and, when the reference member and the locating member are not engaged with a machine tool element, the reference plate assumes this centric position with its peripheral surface extending beyond the peripheral surface of the head. When the head and reference member together engage the machine tool element, the reference plate is displaced from its centric position. Since the distance from the surface of the eccentric head to the axis of the rotation of the head varies, rotation of the head will move a machine tool element engaged therewith. At the same time, the displacement of the reference member from a centric position will change as the head is rotated in exactly the same relation as the machine tool element moves. A plunger mounted in the head is engaged, through a ball, with the conical seat in the reference plate so that displacement of the reference plate produces axial movement of the plunger proportional to displacement of the reference plate. Measurement of the axial movement of the plunger, which can be done with a gage remote from the machine tool element, gives an accurate indication of the amount of movement, or the position, of the machine tool element.

The rotation of an eccentric locating member to move a machine tool element is desirable because a large amount of angular rotation can be used to effect a small amount of movement of the machine tool element, which facilitates precise positioning of the element. The output movement is not, however, proportional to the angular input movement, and judging the extent of output movement by measuring the angular extent of the input movement is not satisfactory because of the nonlinearity of the relation between input movement and output movement. In the device of the present invention, however, measuring the extent of displacement of the reference plate gives an indication of movement of the machine tool element which is proportional to that movement.

It is therefore one object of the present invention to provide an improved machine tool positioning mechanism capable of precise, accurate, positioning of a machine tool element even from a position remote therefrom. It is another object of the present invention to provide an improved machine tool positioning mechanism operable to sense the output of motion transmitting mechanism. It is yet another object of the present invention to provide an improved machine tool positioning mechanism operable to sense the movement of a machine tool element and give a reading linearly related to that movement.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 2 is a view taken on the line 2—2 of FIG. 1;

Figure 1:
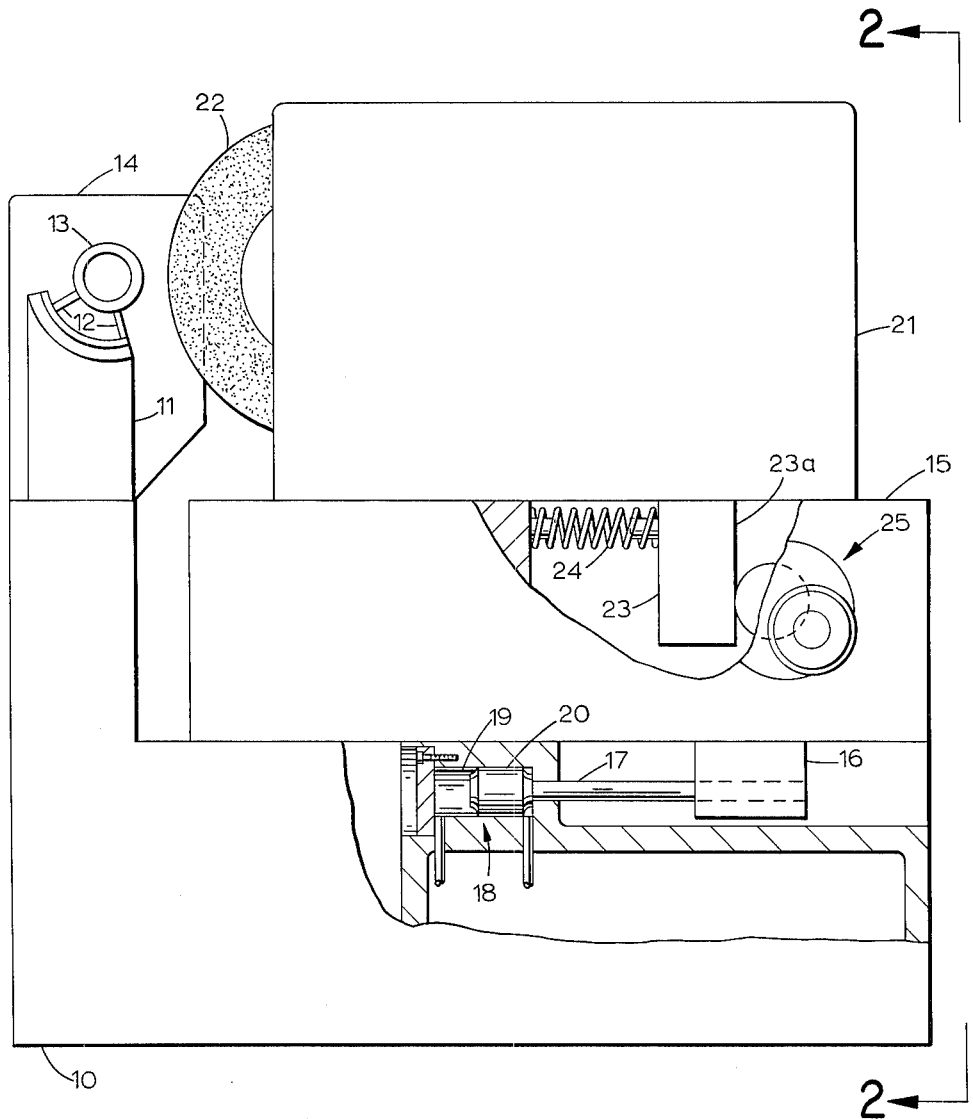
FIG. 1 is a view in elevation of a grinding machine incorporating the present invention.

There is shown in FIG. 1 a grinding machine having a base 10. A workpiece support 11 is mounted on the base and has a pair of shoes 12 to support an annular workpiece 13 in a fixed position for grinding. A headstock 14 has an annular magnetic face plate (not shown) which engages the end of the workpiece to rotate the workpiece in the fixed shoes 12 during grinding. A carriage 15 mounted on base 10 has a depending portion 16 connected to rod 17. A fixed stroke fluid operated motor 18 comprises a cylinder 19 and a piston 20 slidably received in the cylinder. The piston 20 is connected to rod 17 to reciprocate the carriage. A wheelhead 21 has a grinding wheel 22 rotatably mounted therein which is fed into the workpiece 13 for grinding, and retracted from the workpiece to permit replacement of the workpiece, by reciprocation of the carriage 15.

With the machine tool construction shown for illustrating the present invention, the wheelhead 21 must be positioned exactly on the carriage 15 to produce a finished workpiece 13 of precise desired size. For this purpose, the wheelhead 21 has a depending portion 23. A spring 24, interposed under compression between a surface of carriage 15 and depending portion 23 of the wheelhead, urges the wheelhead and the depending portion rearwardly on the carriage. The precise position of the wheelhead on the carriage is determined by the positioning mechanism, indicated generally at 25, which is engaged by surface 23a of depending portion 23 of the wheelhead. It will be noted that the positioning mechanism 25 can be used with other types of feed mechanism. For example, if the carriage 15 were a fixed member and the wheelhead 21 were advanced on the fixed member for feeding the grinding wheel into the workpiece, the positioning mechanism could be mounted in front of wheelhead portion 23 to stop the wheelhead at the precise position which would produce a finished workpiece of the desired size. Alternately, if the feed of a wheelhead on a fixed carriage were effected by a fixed stroke motor, the positioning mechanism 25 could be mounted behind the depending portion of the wheelhead to define the retracted position of the wheelhead. With the retracted position of the wheelhead precisely defined by the positioning mechanism 25, the fixed stroke feed movement would precisely advance the wheelhead to a precisely defined final position relative to the workpiece. In addition to acting as a stop, the positioning mechanism 25 can be used to effect precise controlled movement of a machine tool element, such as the wheelhead 21, and, in fact, in the usual manner of setting the mechanism to function as a stop, precise controlled movement of the machine tool element is effected during set up of the machine.

Figure 4:
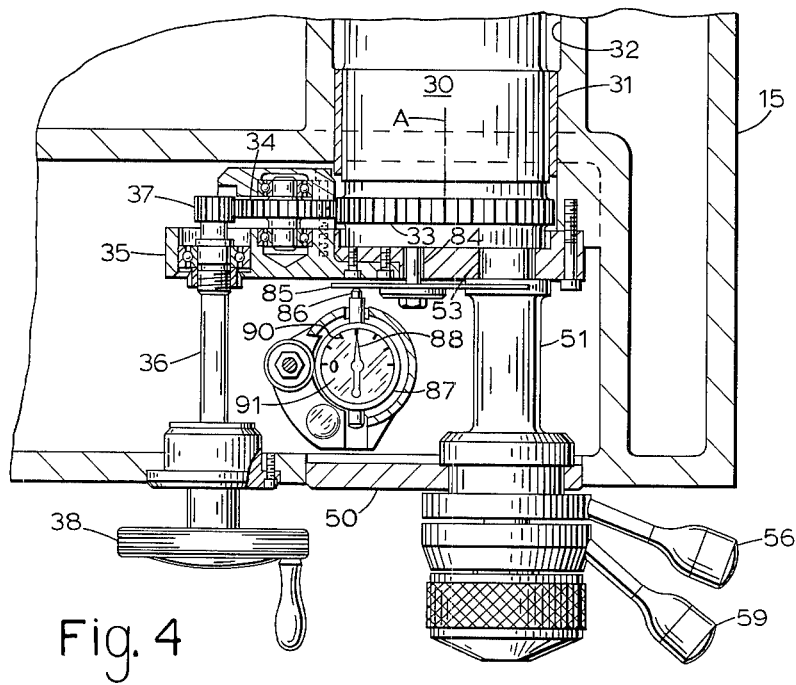
FIG. 4 is a view taken on the line 4—4 of FIG. 3.

A drum 30, having a central longitudinal axis A, is rotatably received in sleeve bearings 31 which are tightly secured in a large bore 32 of carriage 15. As shown best in FIG. 4, the drum 30 has integral gear teeth 33 on the outer surface which mesh with an idler gear 34 mounted in a plate 35 secured in the carriage. A shaft 36, journaled in the carriage, has a pinion 37 at one end engaged with idler gear 34 and has a handwheel 38 connected to the opposite end, outside the carriage. Rotation of handwheel 38 will thus rotate drum 30 in axis A.

The drum 30 has an internal bore 39 with a central axis B spaced a distance E from axis A, as shown best in FIG. 2. The bore 39 has a pair of roller bearings 40 tightly secured therein. A shaft 41 is mounted in the bearings 40 with its central longitudinal axis in axis B. A gear 42 connected to shaft 41 is engaged with a pinion 43. The pinion 43 is secured on the inner end of a shaft 44 which is tightly secured at its outer end to a knob 46 outside the carriage 15. Rotation of knob 46 will therefore rotate shaft 41 in axis B.

Figure 3:
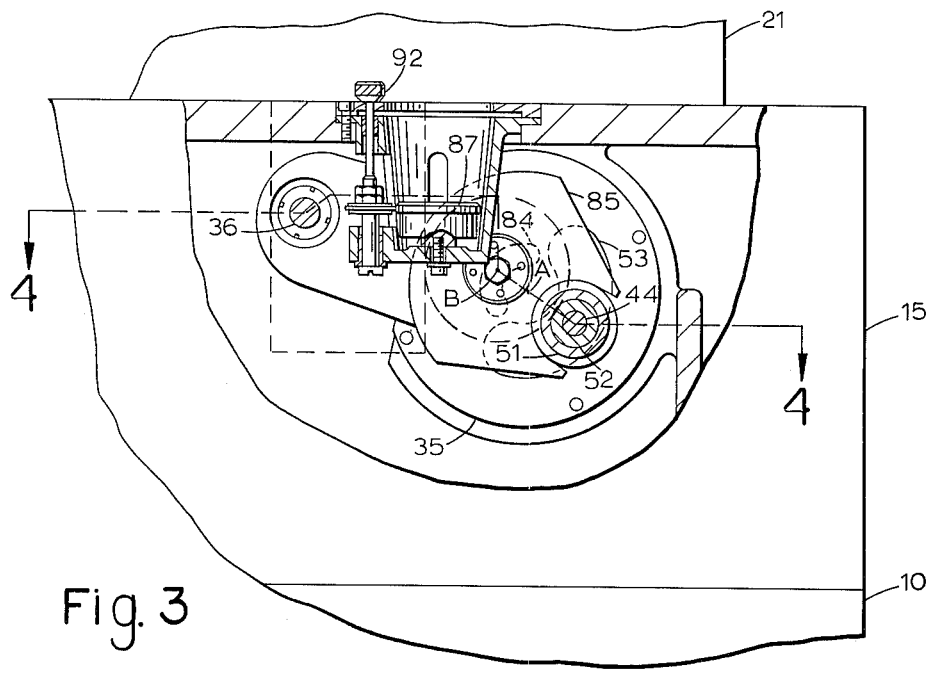
FIG. 3 is a view taken on the line 3—3 of FIG. 2.

A circular plate 50, having its center in the axis A of rotation of drum 30, is rotatably mounted in carriage 15 and tightly receives a sleeve 51 which extends inwardly to plate 35. Another sleeve 52, received in sleeve 51, extends through an arcuate slot 53 (see FIG. 3) in plate 35 and is clamped tightly in the drum by nut 54. The sleeve 52 threadedly receives a hub 55 having a drum clamping handle 56. When hub 55 is rotated in one direction on sleeve 52 by handle 56, the hub, acting through thrust bearing 57 and sleeve 51, clamps the rotatable drum 30 to the fixed plate 35 secured in the carriage to prevent rotation of the drum. Rotation of hub 55 in the opposite direction on sleeve 52 releases the drum for rotation in response to rotation of handwheel 38. Another hub 60 is threadedly received on sleeve 52 and has a ball bearing 58 which rotatably receives the knob 46. When the hub 60 is rotated in one direction by a shaft clamping handle 59, the hub, acting through bearing 58, urges the knob 46 to the left as viewed in FIG. 2. The knob 46, which is secured to shaft 44, pulls the shaft to the left, drawing the tapered portion 44a thereof into a coacting complementary tapered portion of sleeve 52 to prevent rotation of shaft 44, thereby preventing rotation of shaft 41. Rotation of hub 60 in the opposite direction on sleeve 52 frees shaft 44 for rotation and permits rotation of shaft 41 in axis B in response to rotation of knob 46.

The shaft 41 has a head 65 with a cylindrical peripheral surface 66 which is eccentric with respect to shaft 41. In other words, the center C of the head 65 (see FIG. 5) is displaced a distance $e$ from the central axis B of rotation of shaft 41. The head 65 has a flat end face 67 normal to axis B which slidably receives a circular reference plate 68 having a cylindrical peripheral surface 69. As shown best in FIG. 6, the reference plate 68 is held in slidable relation with end face 67 by a backing plate 70 which is clamped between spacers 71 and an end plate 72, the spacers 71, backing plate 70, and end plate 72 being secured to head 65 by bolts 73. The spacers 71 and bolts 73 pass through clearance holes 74 in reference plate 68. Balls 75, interposed between reference plate 68 and backing plate 70, and supported by a ball guide 76 which is held by a spring wire 77 connected to end plate 72, facilitate lateral movement of reference plate 68 relative to head 65 to the extent permitted by the clearance holes 74.

Figure 5:
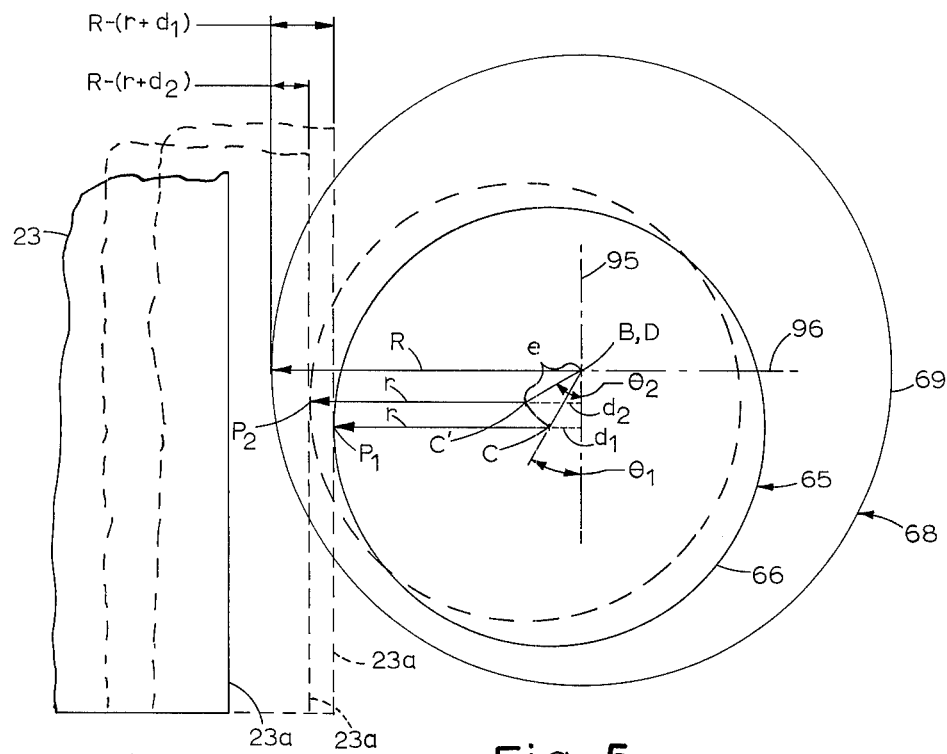
FIG. 5 is a schematic diagram showing the relative positions of the locating member and reference member before engagement by a machine tool element.
Figure 6:
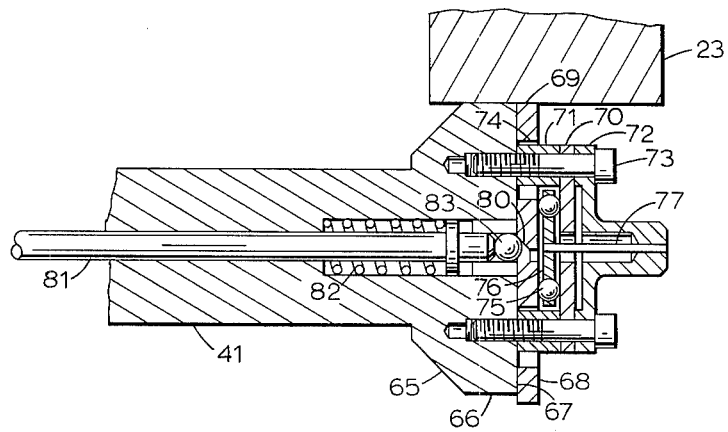
FIG. 6 is an enlarged view taken on the line 6—6 of FIG. 2.

The circular reference plate 68 has a conical seat 80 at the center D of the plate (see FIG. 5). A plunger 81 is slidably received in shaft 41 on the central axis B thereof and is biased toward the reference plate 68 by spring 82. A ball 83 received in the conical seat 80 of the plate is engaged by the forward end of the plunger 81. The plunger 81 extends through an arcuate slot 84 in the plate 35 secured to the carriage 15 (see FIG. 3), and the rear end of the plunger 81 has a plate 85 secured thereto. The plate 85 engages the finger 86 of a gage 87 (in any angular position of drum 30) so that the gage pointer 88, which is connected to finger 86, will assume a position corresponding to the axial position of shaft 81 and will move in accordance with axial movement of shaft 81.

In operation of the positioning mechanism of the present invention, it is the peripheral surface 66 of the head 65 which locates, or positions, the machine tool element (in the illustrative example of the invention disclosed herein, the wheelhead). With the drum 30 unclamped, the handwheel 38 is turned to rotate drum 30. This serves to swing the shaft 41 about axis A (in an orbit with radius E) to provide a coarse positioning of head 65. By way of example, the radius E may be 1 inch to provide a 2 inch range of movement of head 65. It will be noted that the circular plate 50 rotates in carriage 15 to permit orbiting of sleeves 51, 52 on rotation of the drum. After the shaft 41 (and head 65 thereof) are swung to the approximate desired position, the drum 30 is clamped in the carriage 15 by handle 56.

When the wheelhead portion 23 is out of engagement with the head (as shown in solid lines FIG. 5), the circular reference plate 68 is urged to a centric position with respect to axis B (by the ball 83 on axis being urged into the conical seat 80 which is in the center of plate 68) so that the center D of the plate 68 is displaced the distance $e$ (exaggerated for clarity in FIG. 5) from the center C of the head 65. By way of example, the distance $e$ may be .010 inch so that each half revolution of head 65 provides a range of fine movement of an element engaged with the head of .200 inch. The diameter of the reference plate 68 is enough larger than the diameter of the head so that the surface 69 of the reference plate extends beyond the surface 66 of the head all around the head before the head is engaged by the machine tool element. As shown in FIG. 5, since the head 65 is eccentric with respect to axis B, the horizontal distance from a vertical line 95 through axis B to surface 66 through center C of the head will vary as the angular position of the head varies. Since the surface 23a of the machine tool element 23, when engaged with head 65, will engage the head at only one point (on the horizontal line through center C) the distance of the machine tool element from axis B (which is fixed after the drum 30 is clamped) will vary as the head is rotated. Before engagement of the machine tool element with head 65, however, the peripheral surface 69 of the reference plate, which is centric with respect to axis B, will everywhere be the constant distant R from the axis B, regardless of the angular position of the head 65 and the plate 68 which is rotated with the head. If, for example, the head 65 is in an angular position where the center C of the head is at an angle $\theta_1$ from the vertical line 95 through axis B, the horizontal distance from a point $P_1$ on surface 66 through center C to line 95 will be $(r+d_1)$ as shown in FIG. 5. Thus, after the machine tool element 23 is engaged with surface 66 at point $P_1$, the the center D of plate 68 (and the conical seat 80 on center D) will be displaced laterally to the right, as viewed in FIG. 5, a distance $(R-(r+d_1))$ on the horizontal line 96 through axis B from vertical line 95 and axis B. Assuming the sides of the conical seat 80 to be at angles of 45 degrees, this lateral displacement of the reference plate will effect an equal axial displacement of the shaft 81 which operates the gage.

After the machine tool element is engaged with the head, a grind is made on a workpiece by reciprocating the carriage with fixed stroke motor 18. The workpiece is measured and the difference in actual diameter to desired diameter is noted. If the workpiece is, for example, .0004 inch oversize, the wheelhead 21 must be advanced .0002 inch on carriage 15. To effect this adjustment, the knob 46 is rotated, to rotate the head, in a direction to increase the distance of head surface 66 from axis B. Thus, as can be seen from FIG. 5, the head is rotated clockwise through an angle $(\theta_2-\theta_1)$, for example, to bring center C to the position indicated at C' and to bring point $P_2$ into engagement with the surface 23a of the machine tool element engaged with the head. The point $P_2$ is spaced a horizontal distance $(r+d_2)$ from the vertical line 95 through axis B and, consequently, the machine tool element 23 is moved a distance $(d_2-d_1)$ as the head 65 is rotated from the angular position $\theta_1$ to the angular position $\theta_2$. The surface 69 of plate 68 remains in engagement with surface 23a of the machine tool element as that element moves and, when the center of the head is at an angle $\theta_2$ from line 95 with point $P_2$ engaged with surface 23a, the center D of the plate will be a distance $R-(r+d_2)$ from the vertical line 95 and axis B. Thus, the plate 68 will shift laterally a distance $(d_2-d_1)$ to the left as viewed in FIG. 5 when the center of the head swings from angular position $\theta_1$ to $\theta_2$ relative to line 95, the same distance the machine tool element was moved. This lateral movement of the plate to the left, on horizontal line 96, causes the ball 83 to settle in the conical seat so that plunger 81 is shifted to the right as viewed in FIG. 2 by spring 82. This operates the gage (which is calibrated in terms of movement of wheelhead 21 on carriage 15) and the operator, by watching the gage pointer as he turns knob 46, knows when the wheelhead is correctly positioned. If, for example, each mark 90 on the gage face 91 indicates .0001 inch of movement of wheelhead 21, the operator may rotate the gage face 91 by knob 92 connected thereto after the trial grind to set the 0 on the gage face to the position of the pointer. Thus, when the pointer reaches the second mark from 0 during the fine positioning, the operator will know the wheelhead is in the correct position, and the operator will then lock the head 65 in this angular position by clamp handle 59.

It will be noted that use of a head 65 eccentric to the axis of rotation B thereof permits a large input actuating movement (angular rotation of knob 46) to produce a small output positioning movement (movement of wheelhead 21) which is conductive to accurate positioning. However, measuring the angular input rotation to produce a desired output would not be satisfactory. For one thing, the motion transmitting mechanism connecting knob 46 with head 65 includes gears 42, 43 (with inherent backlash) and long shaft 41 which, under a load, would have a tendency to wind up, making angular measurement of rotation of knob 46 and unreliable indicator of movement (or position) of wheelhead 21. In the present invention, it is the displacement of the reference plate 68 (right at the machine tool element) which is measured, and this measurement is transmitted directly by axial movement of shaft 81 to the gage. In other words, the output of the motion transmitting mechanism is mechanically measured, or sensed, in the present invention and the measured value of this output is transmitted to a readout, or gage, 87 mechanically, without intervening gears between the measuring mechanism and the readout mechanism.

Another reason why angular measurement of knob 46, or even shaft 41, is not a satisfactory indicator of movement of machine tool element 21 is that movement of wheelhead 21 will not be proportional to rotation of head 65 (and hence to rotation of shaft 41 or knob 46). This is because the surface of head 65 is eccentric to the axis B of rotation thereof so that the amount of movement imparted to wheelhead 21 for any given incremental rotation of knob 46 will depend on the particular area of the head in contact with the element 21. On the other hand, the displacement of the reference plate 68 is proportional and equal to the movement of the wheelhead at any angular position of head 65, and, therefore, measurement of displacement of the reference plate and operation of the gage in response to this displacement, gives a gage reading in which any incremental movement of the wheelhead produces a given incremental movement of the gage pointer regardless of which area of the head is engaged with the wheelhead. In other words, the gage of the present invention responds linearly to movement of the wheelhead, while a gage which measured rotation of knob 46, shaft 41, or head 65 would not respond linearly to movement of the wheelhead.

What is claimed is:

1. A mechanism for positioning a movable machine tool element comprising,
    (a) a locating member rotatable about an axis and having a peripheral surface of varying distance from said axis adapted for engagement with the machine tool element,
    (b) a reference member adjacent said locating member and having a peripheral surface normally extending a predetermined distance from said axis and beyond the peripheral surface of the locating member when the reference member and the locating member are not engaged with said machine tool element, said reference member displaced laterally with respect to said axis when both the locating member and the reference member are engaged with the machine tool element,
    (c) and means to indicate the extent of lateral displacement of the reference member relative to said axis.

2. A mechanism for positioning a movable machine tool element comprising:
    (a) a locating member rotatable about an axis and having a peripheral surface of varying distance from said axis adapted for engagement with the machine tool element,
    (b) a reference member adjacent said locating member and having a peripheral surface, said reference member biased to a predetermined position with the peripheral surface thereof a predetermined distance from said axis and beyond the peripheral surface of the locating member when the reference member and the locating member are not engaged with said machine tool element, said reference member displaced laterally with respect to said predetermined position when both the locating member and the reference member are engaged with the machine tool element, (c) a plunger mounted in one of said members and engaged with the other of said members on said axis for movement in accordance with lateral shifting of said reference member, (d) and a gage connected to said plunger for operation thereby.

3. A mechanism for positioning a movable machine tool element comprising, (a) a locating member rotatable about an axis and having a peripheral surface of circular cross-section eccentric with respect to said axis, said peripheral surface adapted for engagement with the machine tool element, (b) a reference member adjacent said locating member and having a peripheral surface of circular cross-section, said reference member biased to a position centric with respect to said axis, the peripheral surface thereof extending beyond the peripheral surface of the locating member when the reference member is centric with respect to said axis, said reference member displaced from said centric position when the locating member and the reference member are engaged with the machine tool element, the extent of said displacement depending on the angular position of the locating member, (c) and means to indicate the extent of displacement of said reference member from said centric position.

4. A mechanism for positioning a movable machine tool element comprising, (a) a locating member rotatable about an axis and having a cylindrical peripheral surface eccentric with respect to said axis, (b) a reference member adjacent said locating member, said reference member having a central conical seat and having a cylindrical peripheral surface extending beyond the peripheral surface of the locating member when the reference member is centered with respect to said axis, said reference member displaced with respect to said axis when the peripheral surfaces of the locating member and the reference member are engaged with a surface on the machine tool element, (c) a plunger mounted in the locating member on said axis and axially movable in accordance with the displacement of said conical seat from said axis, (d) and a gage connected to said plunger for operation thereby.

5. A mechanism for positioning a movable machine tool element comprising, (a) a shaft rotatable on an axis and having a head secured thereto at one end for rotation therewith, said head having an external surface of circular cross-section eccentric with respect to said axis and adapted to engage the machine tool element, (b) a circular plate mounted on said head opposite the shaft and having a central conical seat, said plate extending beyond the peripheral surface of the head when the conical seat is on said axis and said conical seat displaced from said axis when the head and plate are engaged with the machine tool element, (c) a ball mounted in the conical seat, (d) a plunger mounted in the shaft on the axis of rotation thereof and terminating in the head, said plunger biased into engagement with the ball to bias the circular plate to a centric position relative to said axis with the conical seat on said axis, said plunger shifted axially when the conical seat is displaced from said axis, (e) and a gage connected to the plunger for operation thereby.

6. A mechanism for positioning a movable machine tool element comprising, (a) a shaft rotatable on an axis and having a locating head secured thereto at one end for rotation therewith, said head having an external cylindrical peripheral surface eccentric with respect to said axis and adapted to engage the machine tool element, (b) a circular plate mounted on said head opposite the shaft and having a central conical seat, said plate extending beyond the peripheral surface of the head when the conical seat is on said axis and said conical seat displaced from said axis when the head and plate are engaged with the machine tool element, (c) a ball mounted in the conical seat, (d) a plunger mounted in the shaft on the axis of rotation thereof and terminating in the head, said plunger biased into engagement with the ball to bias the circular plate to a centric position relative to said axis with the conical seat on said axis, said plunger shifted axially when the conical seat is displaced from said axis, (e) a gage connected to the plunger for operation thereby, (f) and means to shift said shaft to a selected position.

7. A mechanism for positioning a movable machine tool element comprising, (a) a drum rotatable on a first axis, (b) a shaft mounted in the drum for rotation on a second axis displaced from said first axis, said shaft having a locating head secured thereto at one end for rotation therewith, said head having an external peripheral surface eccentric with respect to said second axis and adapted to engage the machine tool element, (c) a circular plate mounted on said head opposite the shaft and having a central conical seat, said plate extending beyond the peripheral surface of the head when the conical seat is on said second axis and said conical seat displaced from said second axis when the head and plate are engaged with the machine tool element, (d) a ball mounted in the conical seat, (e) a plunger mounted in the shaft on said second axis and terminating in the head, said plunger biased into engagement with the ball to bias the circular plate to a centric position relative to said second axis with the conical seat on said second axis, said plunger shifted axially when the conical seat is displaced from said second axis, (f) and a gage connected to the plunger for operation thereby.

References Cited by the Examiner

UNITED STATES PATENTS

| | | | |
|---|---|---|---|
| 909,300 | 1/1909 | Hirth | 51—165 |
| 2,665,496 | 1/1954 | Wynne | 33—178 |

LESTER M. SWINGLE, *Primary Examiner.*